(12) United States Patent
Gamberini

(10) Patent No.: US 7,357,275 B2
(45) Date of Patent: Apr. 15, 2008

(54) UNIT FOR FEEDING CAPSULES ONTO A CAPSULE FILLING MACHINE

(75) Inventor: Ernesto Gamberini, Rastignano (IT)

(73) Assignee: MG2 S.r.l., Pianoro (IT)

( * ) Notice: Subject to any disclaimer, the term of this patent is extended or adjusted under 35 U.S.C. 154(b) by 439 days.

(21) Appl. No.: 10/761,214

(22) Filed: Jan. 22, 2004

(65) Prior Publication Data

US 2004/0149769 A1   Aug. 5, 2004

(30) Foreign Application Priority Data

Jan. 24, 2003   (IT)   .......................... BO2003A0034

(51) Int. Cl.
    *B23Q 7/12*   (2006.01)
(52) U.S. Cl. .................... 221/173; 221/163; 198/752.1
(58) Field of Classification Search ................. 221/163, 221/167, 169, 172, 173, 211, 290, 294, 296; 198/752.1

See application file for complete search history.

(56) References Cited

U.S. PATENT DOCUMENTS

| | | | | |
|---|---|---|---|---|
| 4,335,810 A | * | 6/1982 | Ackley et al. .............. 198/380 |
| 4,377,971 A | * | 3/1983 | Ackley .......................... 101/40 |
| 4,394,933 A | * | 7/1983 | Ackley ........................ 221/173 |
| 5,765,655 A | * | 6/1998 | Tatsuoka .................. 177/25.18 |
| 5,845,810 A | * | 12/1998 | Laznicka ..................... 221/172 |
| 5,966,910 A | * | 10/1999 | Ribani et al. .................. 53/560 |
| 6,168,045 B1 | | 1/2001 | Ansaloni |
| 6,405,894 B1 | * | 6/2002 | Leather ....................... 221/168 |
| 6,421,982 B1 | * | 7/2002 | Eichenberger ............... 53/253 |
| 6,739,455 B2 | * | 5/2004 | Yamamoto et al. ......... 209/643 |
| 7,073,658 B2 | * | 7/2006 | Biancoli et al. ............. 198/757 |
| 7,128,203 B2 | * | 10/2006 | Baranowski ............. 198/752.1 |
| 7,128,204 B2 | * | 10/2006 | Baranowski ............. 198/752.1 |
| 2002/0139589 A1 | * | 10/2002 | Matsuyama et al. ..... 177/25.18 |

\* cited by examiner

*Primary Examiner*—Gene O. Crawford
*Assistant Examiner*—Rashmi Sharma
(74) *Attorney, Agent, or Firm*—Finnegan, Henderson, Farabow, Garrett & Dunner, LLP

(57) ABSTRACT

In a machine for filling capsules, a hopper containing the capsules is mounted to rotate about a respective first axis of rotation, so as to move about the first axis a number of feed channels, each of which receives the capsules successively from the hopper, and has a longitudinal second axis forming an angle of other than 90° with a reference plane perpendicular to the first axis.

14 Claims, 4 Drawing Sheets

UNIT FOR FEEDING CAPSULES ONTO A CAPSULE FILLING MACHINE

The present invention relates to a unit for feeding capsules onto a capsule filling machine.

More specifically, the present invention relates to a unit for feeding capsules onto a machine for filling capsules with at least one drug, to which the following description refers purely by way of example.

BACKGROUND OF THE INVENTION

In the pharmaceutical industry, a capsule filling machine is known comprising a unit for feeding capsules onto a line for filling the capsules with said drug.

The feed unit normally comprises a hopper containing the capsules, and which is mounted to rotate continuously at a given angular speed about a respective substantially vertical first axis of rotation, and is fitted with a number of substantially cylindrical feed channels having respective longitudinal second axes substantially parallel to the first axis and for receiving the capsules successively from the hopper.

As the hopper, and therefore the feed channels, rotate about the first axis, the capsules inside the feed channels are subjected to a centrifugal force perpendicular to the first axis and proportional to the square of said angular speed.

Though amply tried and tested, known feed units of the above type have a relatively low output rate, on account of the angular speed of the hopper being limited to a given value, over and above which the centrifugal force prevents the capsules being feed along the relative feed channels, and the number of feed channels also being limited to a given value, over and above which the feed unit becomes relatively complex and expensive.

SUMMARY OF THE INVENTION

It is an object of the present invention to provide a unit for feeding capsules onto a capsule filling machine, designed to eliminate the aforementioned drawbacks.

According to the present invention, there is provided a unit for feeding capsules onto a machine for filling capsules, the unit comprising a hopper containing the capsules; the hopper having a first axis of rotation, being fitted with a number of feed channels, and rotating continuously about said first axis to move said feed channels about the first axis; and each feed channel having a longitudinal second axis, and receiving the capsules successively from said hopper; characterized in that each said feed channel is so positioned that the relative said second axis forms a given angle of other than 90° with a reference plane perpendicular to said first axis.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
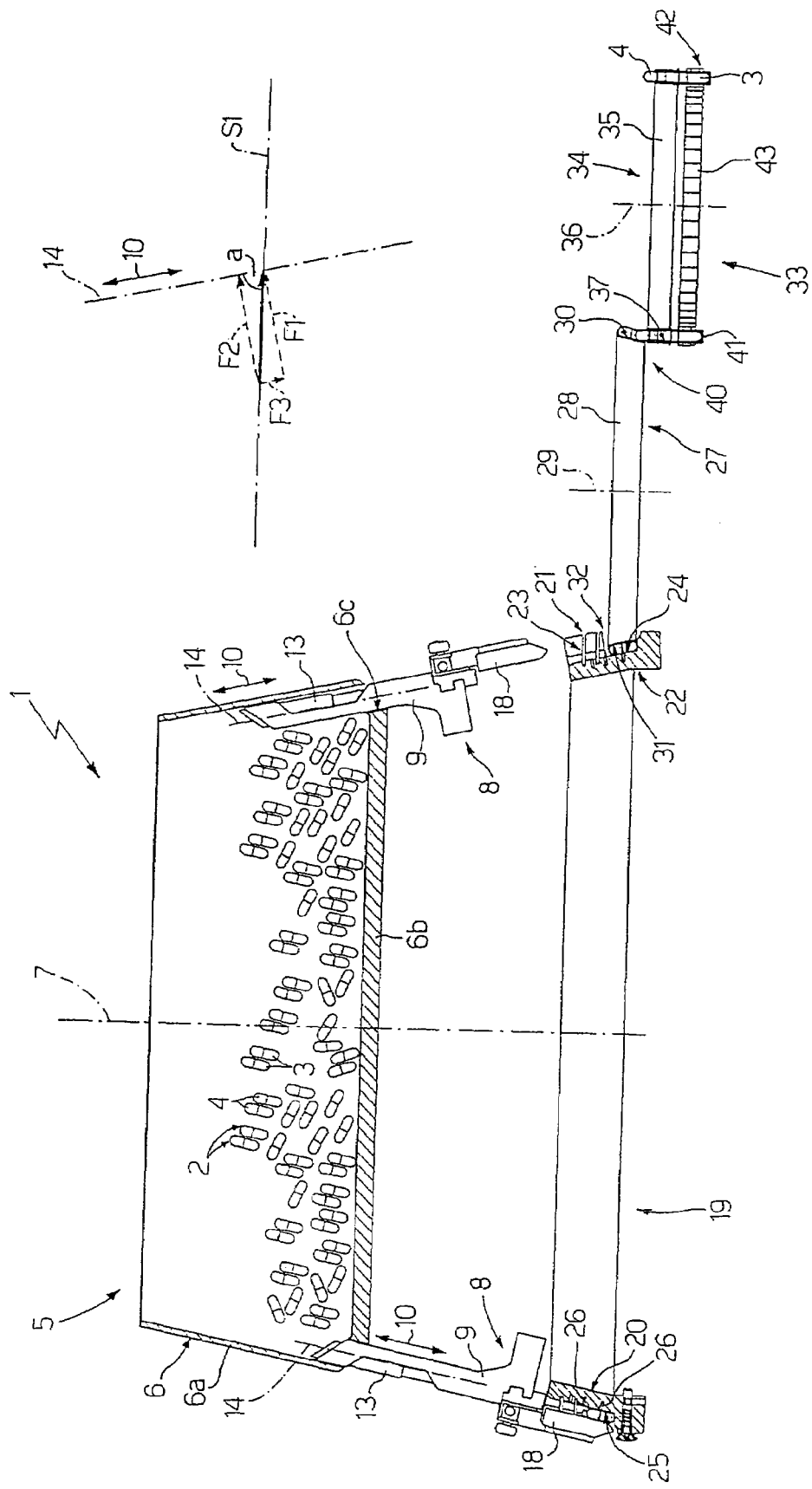
FIG. 1 shows a schematic side view, with parts in section and parts removed for clarity, of a preferred embodiment of the capsule feed unit according to the present invention.
Figure 2:
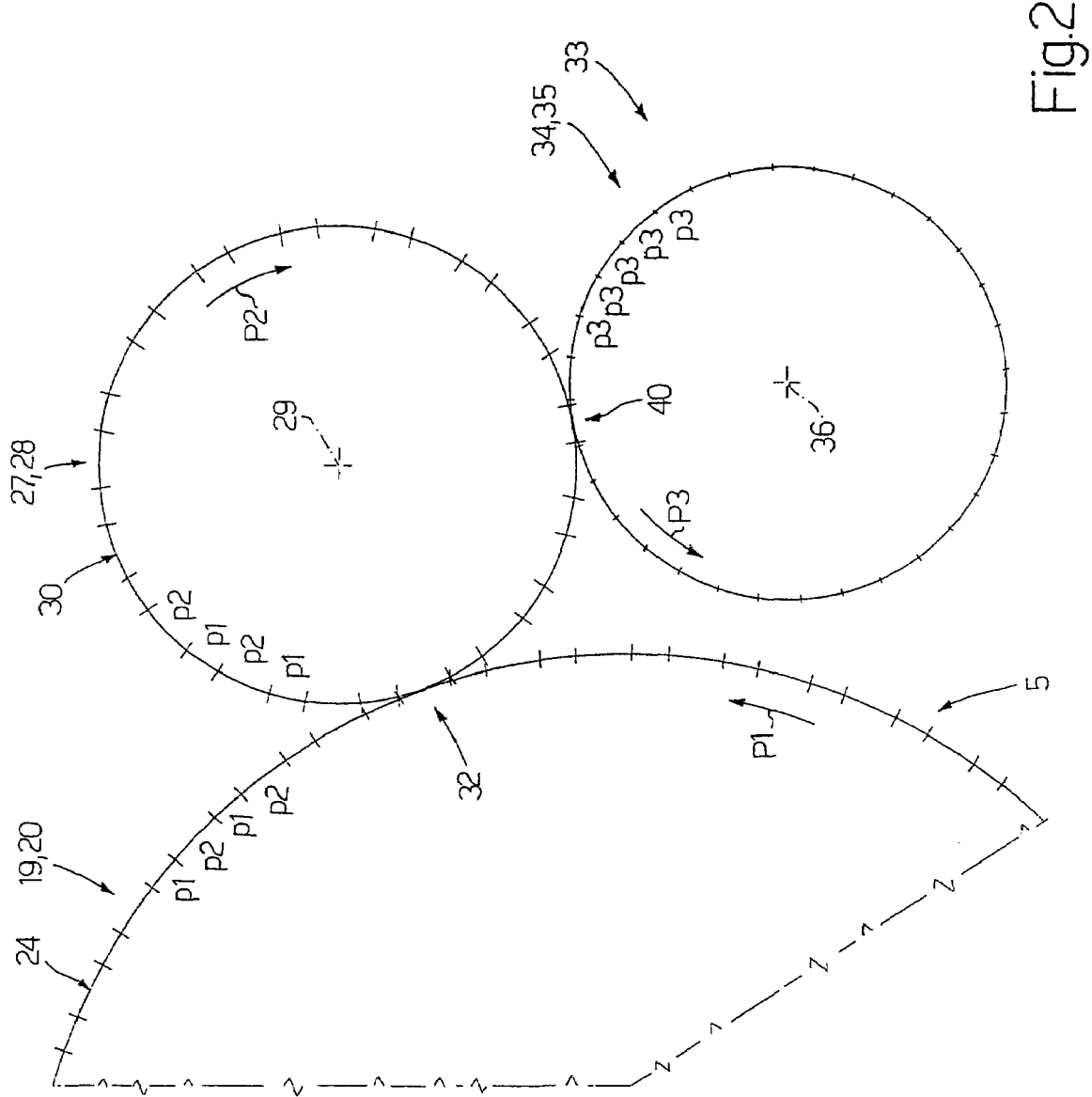
FIG. 2 shows a schematic plan view of the FIG. 1 unit.

With reference to FIGS. 1 and 2, number 1 indicates as a whole a unit for feeding capsules 2 onto a metering line (not shown) of a machine for filling capsules 2 with at least one drug. Each capsule 2 is substantially cylindrical, and comprises a substantially cup-shaped bottom shell 3, and a top shell 4 fitted removably to bottom shell 3.

Unit 1 comprises a feed and position assembly 5, in turn comprising a substantially truncated-cone-shaped hopper 6 containing capsules 2 and fitted in rotary manner to a fixed frame (not shown) of unit 1 to rotate continuously, with respect to the frame (not shown) and in a given direction (anticlockwise in FIG. 2), about a respective substantially vertical longitudinal axis 7.

Hopper 6 is bounded laterally by a substantially truncated-cone-shaped lateral wall 6a, and is bounded at the bottom by a bottom wall 6b perpendicular to axis 7 and smaller in diameter than the bottom end of wall 6a so as to define, with wall 6a, an annular channel 6c.

Hopper 6 is fitted with a number of feed devices 8, which are equally spaced about the periphery of hopper 6, are fed by hopper 6 about axis 7, and each comprise a respective elongated supporting bar 9 extending in a relative direction 10 sloping by an angle a of other than 90° with respect to a reference plane S1 perpendicular to axis 7.

Figure 3:
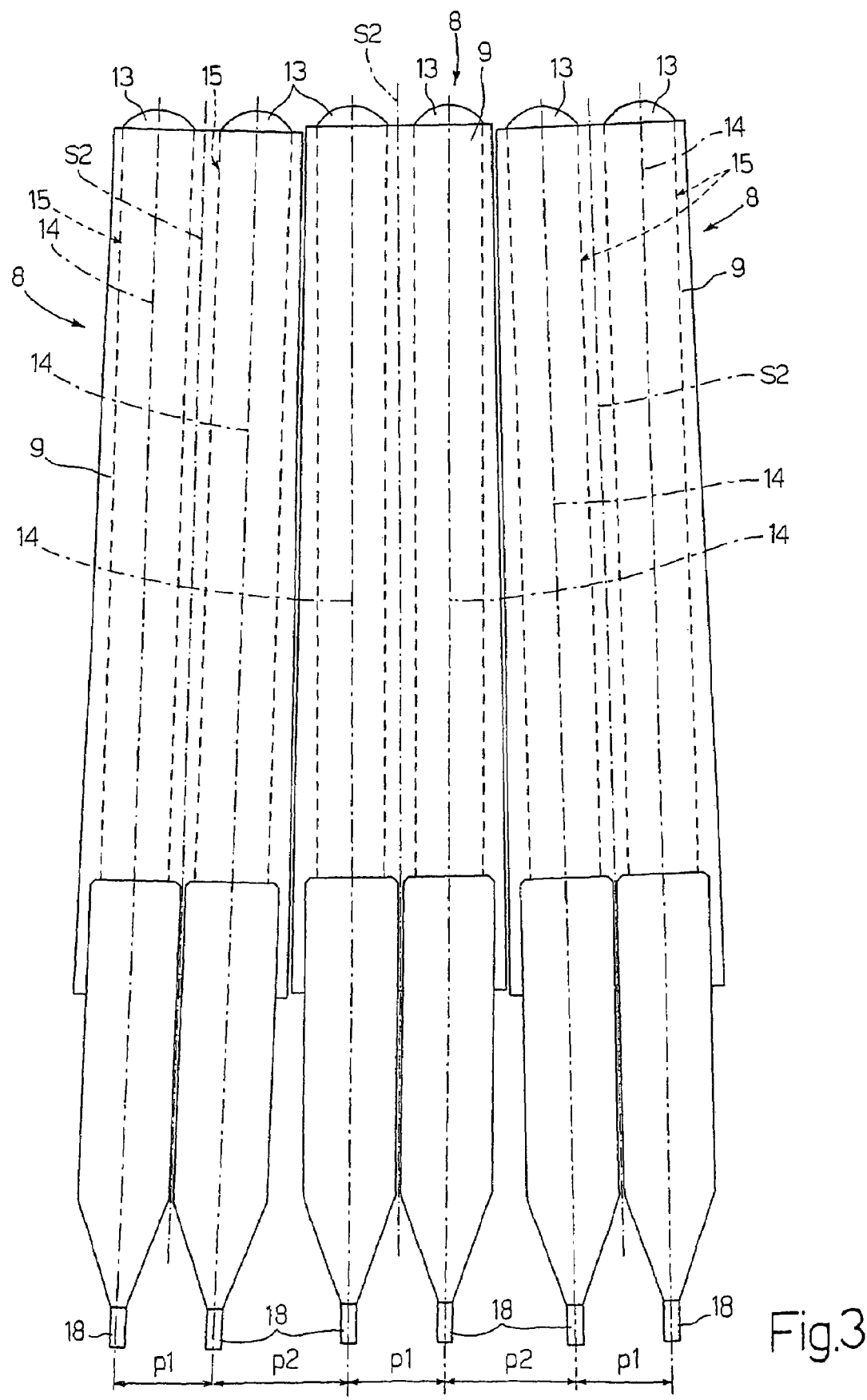
FIG. 3 shows a schematic side view of a detail of the FIGS. 1 and 2 unit.

Bar 9 is fitted in axially sliding manner through channel 6c to move linearly in relative direction 10—with respect to hopper 6 and under the control of a known cam actuating device not shown—between a raised position and a lowered position (FIG. 1). With reference to FIG. 3, bar 9 has a longitudinal plane S2 of symmetry containing axis 7, and comprises, in the example shown, two substantially cylindrical sleeves 13 located on opposite sides of plane S2, extending through bar 9, and connected in axially and angularly fixed manner to bar 9.

Each sleeve 13 has a longitudinal axis 14 extending parallel to direction 10 and plane S2, and therefore sloping at angle a with respect to plane S1, defines a feed channel 15 (FIG. 4a) coaxial with axis 14, and has a substantially flat orienting plate 18 projecting downwards from sleeve 13.

Assembly 5 also comprises a first transfer wheel 19, in turn comprising a substantially truncated-cone-shaped drum 20, which is mounted beneath hopper 6 and devices 8, coaxially with axis 7, is connected in angularly fixed manner to hopper 6 to rotate about axis 7, and comprises a wide top portion 21 and a recessed bottom portion 22 so as to be substantially L-shaped in axial section.

Figure 4:
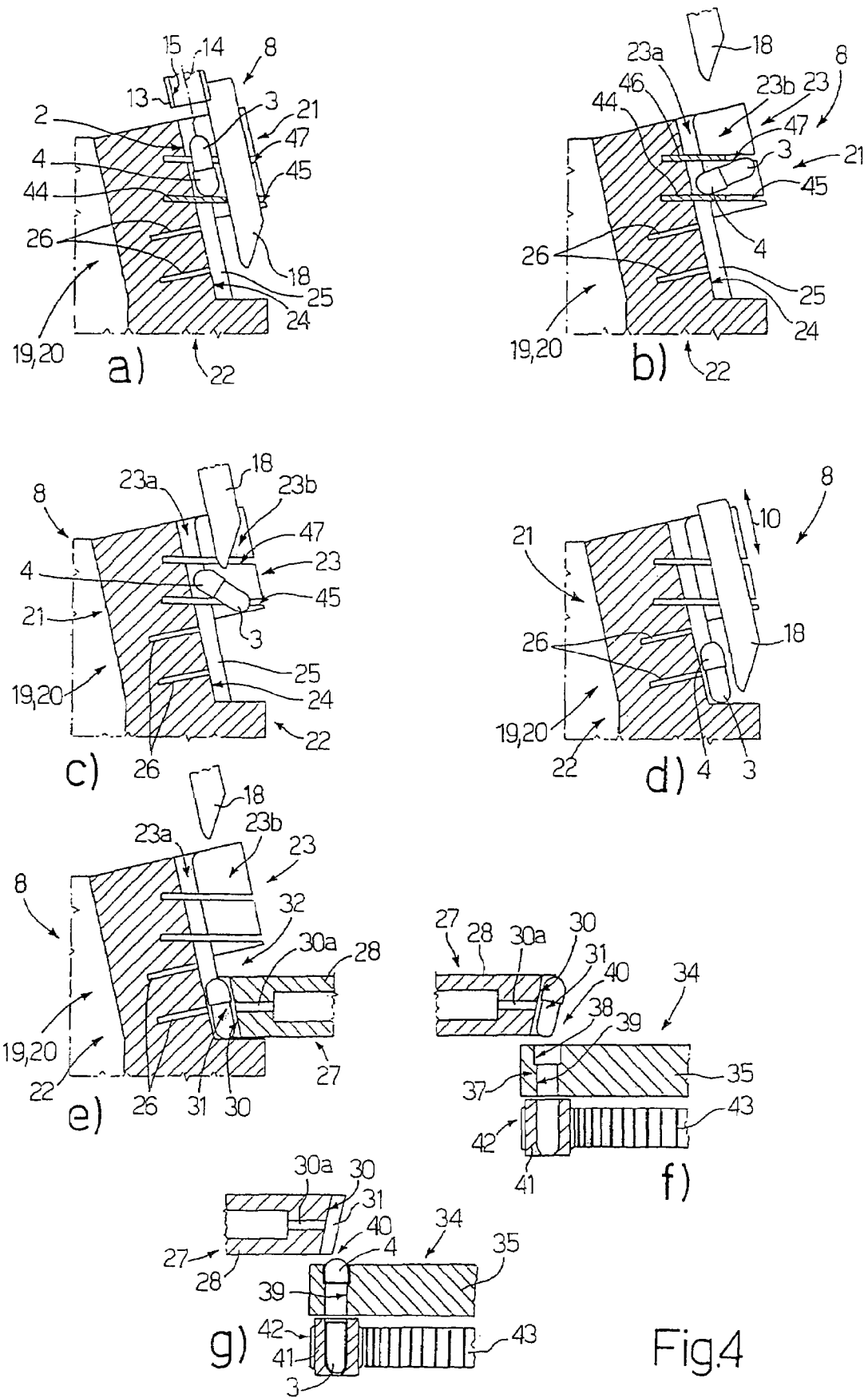
FIG. 4 shows the operating principle of the FIGS. 1 and 2 unit.

As shown in FIG. 4, portion 21 comprises a number of grooves 23, which are equal in number to channels 15, are spaced along the periphery of portion 21 with the same spacing as channels 15, extend through portion 21 in relative directions 10, and are open radially outwards. Each groove 23 comprises an inner portion 23a aligned with a relative channel 15 in relative direction 10 to receive capsules 2 successively from relative channel 15, and of a width approximately equal to but no smaller than the diameter of top shell 4; and an outer portion 23b of a width approximately equal to but no smaller than the diameter of bottom shell 3 and no larger than the diameter of top shell 4.

Portion 22 is bounded externally by a substantially truncated-cone-shaped gripping surface 24, which tapers upwards, slopes in axial section by angle a with respect to plane S1, and has a number of substantially semicylindrical seats 25 equal in number to grooves 23 and spaced along surface 24 with the same spacing as grooves 23.

Each seat 25 extends in relative direction 10, is fed by drum 20 along an endless path P1 (FIG. 2) extending about axis 7, is aligned with portion 23a of a relative groove 23 to receive capsules 2 successively from relative groove 23, and communicates with a known pneumatic device (not shown) via a pneumatic circuit 26 shown only partly in FIG. 1.

With reference to FIGS. 2 and 3, since bars 9, and therefore planes S2, are equally spaced about axis 7, and axes 14 slope by angle a with respect to plane S1 and are parallel to relative planes S2, seats 25 are spaced about axis 7 so that seats 25 of the same bar 9 have a spacing p1, and seats 25 of adjacent bars 9 have a spacing p2 greater than spacing p1.

In connection with the above, it should be pointed out that, as feed and position assembly 5 rotates about axis 7, and given the angle a of axes 14 with respect to plane S1, each capsule 2 is subjected to a radial centrifugal force F1 which can be divided into a first component F2 crosswise to relative direction 10, and a longitudinal second component F3 parallel to relative direction 10 and which therefore assists travel of capsule 2 in relative direction 10 and along relative channel 15, relative groove 23, and relative seat 25.

Unit 1 also comprises a second transfer wheel 27, in turn comprising a drum 28, which is fitted in rotary manner to the frame (not shown) of unit 1 to rotate continuously, with respect to the frame (not shown) and in a given direction (clockwise in FIG. 2), about a respective substantially vertical longitudinal axis 29 parallel to axis 7.

Drum 28 is bounded laterally by a substantially truncated-cone-shaped gripping surface 30, which tapers downwards, slopes in axial section by angle a with respect to plane S1, and has a number of substantially semicylindrical seats 31 spaced along surface 30 with the same spacings p1, p2 as seats 25, and communicating with a known pneumatic device (not shown) via a pneumatic circuit 30a (FIGS. 4e and 4f).

Each seat 31 is fed by wheel 27 along an endless path P2, extending about axis 29 and substantially coplanar with path P1, to a transfer station 32 in time with a relative seat 25 of wheel 19, so that, through station 32, the combined action of pneumatic circuit 26 associated with surface 24 and of pneumatic circuit 30a associated with surface 30 enables transfer of capsule 2 from seat 25 of wheel 19 to seat 31 of wheel 27.

Unit 1 also comprises an opening assembly 33 for opening capsules 2 and in turn comprising a third transfer wheel 34 having a substantially cylindrical drum 35 fitted in rotary manner to the frame (not shown) of unit 1 to rotate continuously, with respect to the frame (not shown) and in a given direction (anticlockwise in FIG. 2), about a respective substantially vertical longitudinal axis 36 parallel to axes 7 and 29.

Drum 35 has a number of substantially cylindrical pockets 37, which extend parallel to axis 36, are equally spaced about axis 36 and along the periphery of drum 35 with a spacing p3 substantially greater than spacing p1 and smaller than spacing p2, and are fed by wheel 34 along an endless path P3 (FIG. 2) extending in a plane below and parallel to the plane of path P2. As shown in FIGS. 4f and 4g, each pocket 37 comprises a wide top portion 38 of a diameter approximately equal to but no smaller than the diameter of a top shell 4; and a narrow bottom portion 39 of a diameter approximately equal to but no greater than the diameter of a top shell 4 and no smaller than the diameter of a bottom shell 3.

Each pocket 37 is fed by wheel 34 to a transfer station 40, connecting wheels 27 and 34, in time with a relative pocket 41 of a chain conveyor 42, which extends in a plane parallel to and beneath the plane of path P3, and is looped about a number of sprockets 43, one of which is mounted to rotate about axis 36.

Pockets 41 are equally spaced along conveyor 42 with spacing p3, extend parallel to axis 36, are cup-shaped with their concavities facing upwards, are of substantially the same diameter as a portion 39, and communicate with a known pneumatic device (not shown) via a pneumatic circuit (not shown).

Operation of unit 1 will now be described with reference to FIGS. 1, 2 and 4, and to the supply, positioning, and opening of one capsule 2 only.

By combining rotation of hopper 6, and therefore of feed devices 8, about axis 7 with the linear movement of bars 9 in relative directions 10, the capsule 2 considered is fed into relative feed channel 15 so as to be positioned parallel to and randomly with respect to relative direction 10, i.e. with top shell 4 on top of bottom shell 3, or with bottom shell 3 on top of top shell 4.

As shown in FIG. 4a, as hopper 6 rotates about axis 7, bar 9 moves into the lowered position so that:

relative sleeve 13 is positioned close to portion 23a of a relative groove 23;

the capsule 2 considered is fed inside portion 23a into contact with a bottom supporting blade 44 extending about axis 7 and inside a slot 45 formed radially through top portion 21 of drum 20; and relative orienting plate 18 engages portion 23b of groove 23 to retain capsule 2 radially outwards inside portion 23a.

With reference to FIG. 4b, bar 9 then moves into the raised position, so that plate 18 releases portion 23b, and capsule 2 is oriented in known manner by an orienting blade 46, which extends about axis 7 and inside a slot 47 formed radially through top portion 21 of drum 20, and is separated from blade 44 by a distance substantially equal to half the length of a capsule 2. Given the different widths of portions 23a and 23b, blade 44 moves capsule 2 crosswise to axis 7, with top shell 4 inside portion 23a, and with bottom shell 3 inside portion 23b, regardless of the orientation of capsule 2 in relative direction 10.

As groove 23 is released from blades 44 and 46, bar 9 is moved into the lowered position, so that plate 18 positions capsule 2 parallel to relative direction 10 (FIG. 4c), capsule 2 is fed into relative seat 25, and pneumatic circuit 26 is activated to retain capsule 2 inside seat 25 (FIG. 4d).

Seat 25 is then fed by wheel 19 to station 32 in time with a relative seat 31 of wheel 27, so that, through station 32, by deactivating circuit 26, moving bar 9 into the raised position, and activating circuit 30a, capsule 2 is transferred from seat 25 of wheel 19 to seat 31 of wheel 27 (FIG. 4e).

At this point, seat 31 is fed by wheel 27 to station 40, so that, through station 40, by deactivating circuit 30a and simultaneously activating the pneumatic circuit (not shown) associated with conveyor 42, capsule 2 is first transferred from seat 31 of wheel 27 to a relative pocket 37 of wheel 34 (FIG. 4f), and is then opened (FIG. 4g), so that top shell 4 engages wide top portion 38 of pocket 37, and bottom shell 3 first engages narrow bottom portion 39 of relative pocket 37, and then relative pocket 41 of conveyor 42.

In connection with the above, it should be pointed out that the peripheral speeds of wheels 27 and 34 are so selected that each seat 31 travels through station 40 with a phase difference, with respect to relative pocket 37, below a given value, below which the pneumatic circuit (not shown) associated with conveyor 42 ensures transfer of each capsule 2 from seat 31 of wheel 27 to relative pocket 37 of wheel 34.

In a variation not shown, sleeves 13 of each bar 9 are positioned so that relative axes 14 converge with each other towards relative plane S2, and form angle a with plane S1.

In another variation not shown, sleeves 13 are fitted independently to hopper 6, so that:

sleeves 13 are equally spaced about axis 7 with a given spacing;

axes 14 are positioned to intersect axis 7 and form angle a with plane S1; and seats 25, seats 31, and pockets 37 are equally spaced with the aforementioned spacing about relative axes 7, 29 and 36.

Given the orientation of feed channels 15 with respect to plane S1 and, consequently, the longitudinal component F2 of centrifugal force F1, feed and position assembly 5 can be rotated about axis 7 at relatively high angular speed to achieve a relatively high output rate of unit 1.

The invention claimed is:

1. A unit for feeding capsules onto a machine for filling capsules, the unit comprising:

a hopper for containing the capsules; the hopper having a first axis of rotation, being fitted with a number of feed channels, and rotating continuously about said first axis to move said feed channels about the first axis;

each feed channel having a longitudinal second axis and receiving the capsules successively from said hopper;

each feed channel being positioned such that said second axis forms an angle of other than 90° with a reference plane perpendicular to said first axis; and a first transfer wheel substantially coaxial with said first axis and connected to said hopper to rotate about the first axis; the first wheel having a substantially truncated-cone-shaped first outer peripheral surface, and a number of first seats formed in said first surface, equal in number to said feed channels, and each first seat being adapted to receive at least one of said capsules from at least one of said feed channels.

2. A unit as claimed in claim 1, wherein each feed channel is positioned such that said second axis intersects said first axis.

3. A unit as claimed in claim 1, wherein said feed channels are connected to said hopper so that said second axes are equally spaced about said first axis.

4. A unit as claimed in claim 1, comprising a number of supporting bars connected to said hopper and each supporting bar having at least two of said feed channels; each supporting bar having a longitudinal plane of symmetry containing said first axis.

5. A unit as claimed in claim 4, wherein said supporting bars are connected to said hopper so that said longitudinal planes of symmetry are equally spaced about said first axis.

6. A unit as claimed in claim 4, wherein the feed channels of each supporting bar are positioned with said respective second axes substantially parallel to one another and to said longitudinal plane of symmetry.

7. A unit as claimed in claim 4, wherein the feed channels of each supporting bar are positioned with said respective second axes substantially converging with one another towards said longitudinal plane of symmetry.

8. A unit as claimed in claim 1, comprising:

a second transfer wheel rotatable continuously about a third axis of rotation substantially parallel to said first axis; and a first transfer station connecting said first and said second wheel to each other; said second wheel having a substantially truncated-cone-shaped second outer peripheral surface and a number of second seats formed in said second surface, and each second seat being adapted to receive at least one of said capsules from at least one of said first seats.

9. A unit as claimed in claim 8, comprising:

a third transfer wheel rotatable continuously about a fourth axis of rotation substantially parallel to said first and said third axis; and a second transfer station connecting said second and said third wheel to each other; said third wheel having a number of third seats substantially parallel to said fourth axis, and each third seat being adapted to receive at least one of said capsules from at least one of said second seats.

10. A unit as claimed in claim 9, wherein said feed channels are connected to said hopper so that said second axes are equally spaced about said first axis; said first, second, and third seats being equally spaced about the respective said first, third, and fourth axis.

11. A unit as claimed in claim 9, comprising a number of supporting bars connected to said hopper, each supporting bar having at least two feed channels, the supporting bars having longitudinal planes of symmetry equally spaced about said first axis; the feed channels of each supporting bar being positioned with said second axes substantially parallel to one another and to said longitudinal plane of symmetry.

12. A unit as claimed in claim 11, wherein the feed channels of each supporting bar are associated with a group of said first seats; the first seats in each group of first seats being spaced about said first axis with a first spacing.

13. A unit as claimed in claim 12, wherein each pair of adjacent supporting bars has a pair of adjacent feed channels; each pair of feed channels being associated with a pair of said first seats; and the first seats in each said pair of first seats being spaced about said first axis with a second spacing.

14. A unit as claimed in claim 13, wherein said second seats are spaced about said third axis with the same spacing as said first seats, and said third seats are equally spaced about said fourth axis with a third spacing substantially smaller than said first spacing and substantially greater than said second spacing.

* * * * *